(No Model.)

J. B. CORNWALL & H. A. BARNARD.
SPLIT PULLEY.

No. 409,140. Patented Aug. 13, 1889.

Witnesses
E. H. Serill
A. E. Dowell

Inventors
John B. Cornwall
Herman A. Barnard
Attorney
by H. Alexander

UNITED STATES PATENT OFFICE.

JOHN B. CORNWALL AND HEMAN A. BARNARD, OF MOLINE, ILLINOIS, ASSIGNORS TO THE BARNARD & LEAS MANUFACTURING COMPANY, OF SAME PLACE.

SPLIT PULLEY.

SPECIFICATION forming part of Letters Patent No. 409,140, dated August 13, 1889.

Application filed May 23, 1889. Serial No. 311,831. (No model.)

*To all whom it may concern:*

Be it known that we, JOHN B. CORNWALL and HEMAN A. BARNARD, of Moline, in the county of Rock Island and State of Illinois, have invented certain new and useful Improvements in Split Pulleys; and we do hereby declare that the following is a full, clear, and exact description thereof, reference being had to the accompanying drawings, and to the letters of reference marked thereon, which form part of this specification.

This invention relates to certain improvements in split pulleys. Such pulleys as heretofore constructed have been formed with hubs, which are confined to the shafts to which they are applied by means of keys setting into key-seats in the hub and shaft.

Our invention has for its objects to provide a pulley having no hub, the parts of the pulley being clamped upon the shaft by means of clamping-blocks secured to the cross-arms through which the clamping-bolts by which the parts of the pulley are secured together pass.

Figure 1:
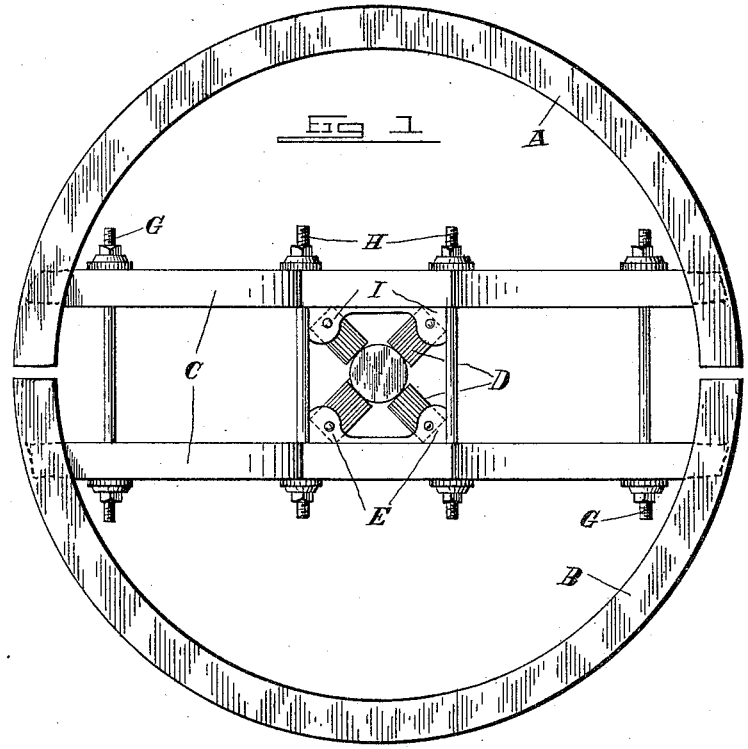
Figure 2:
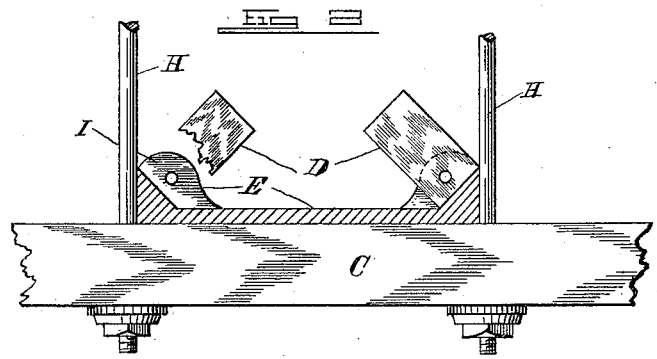

In the accompanying drawings, Figure 1 represents a face view of a pulley constructed according to our invention. Fig. 2 is an enlarged detail view of a portion of one of the cross-bars, showing the clamping-blocks, the clamp-box, and the clamping-bolts in their proper relative positions.

Referring to the drawings, the letters A and B indicate the two parts of the pulley, the rims of which are composed of segments of wood glued together or otherwise united, as usual.

C indicates two main arms, which are preferably made of wood located one in each half of the pulley and extending from side to side of the same, the ends of the arms being let into the rims near each end of the same. The said arms are placed equidistant from the center of the complete pulley to admit the clamping-blocks D. These blocks are preferably made of wood, in width and thickness proportioned to the diameter and face of the pulley, and are located between the arms of the pulley, with one end of each block resting against the shaft and the other end against the arms of the pulley.

The letter E indicates a clamping-box, preferably made of cast-iron, one of which is bolted to each main arm in position to receive the ends of the clamp-blocks and retain them in place against the pressure or strain that may be brought to bear against them. These boxes present broad surfaces which bear against the arms of the pulley and prevent the clamp-blocks from indenting the said arms. The arms of the two parts of the pulley are provided with apertures near their ends, through which bolts G are passed to hold the two halves of the pulley together. The said arms have also apertures near their centers, through which bolts H are passed to clamp the blocks against the shaft. The clamp-boxes are provided with perforated lugs I, through which wood-screws are inserted into the clamp-blocks to hold the same to their seats and prevent them from dropping out when the parts of the pulley are detached. The ends of the clamp-blocks are preferably made square, thus forming an angular bearing in each half of the pulley into which the shaft sets, when the arms C are caused to approach each other by means of the tightening-bolts H.

The clamping-blocks are preferably constructed and placed in their seats so that the pressure shall come endwise to the grain of the wood. They are preferably made of sufficient length, so as to be shortened to fit shafts of different diameters. Should they be required to fit an unusually small shaft, however, wedges of iron or wood may be inserted between them and the clamping-boxes.

Although we prefer to employ clamping-boxes, it is evident that a pulley may be constructed without the same by forming recesses in the arms for the reception of the clamping-blocks; or the clamping-blocks may be so placed as to have their bearings directly against the inner clamping-bolts without departing from our invention.

Having thus described our invention, what we claim, and desire to secure by Letters Patent, is—

1. A pulley constructed in two parts, each having a main cross-arm, intermediate clamping-blocks, and bolts whereby the parts of the pulley are held together and the blocks caused to clamp against the shaft, substantially as specified.

2. The combination, in a split pulley, of the main cross-arms extending from side to side of each part, the bolts for clamping the arms together, the clamping-blocks located between the said arms and the clamping-bolts, whereby the clamping-blocks may be caused to clamp the shaft, substantially as specified.

3. The combination, in a split pulley having its parts held together by bolts passing through the cross-arms thereof, of the clamp-blocks secured to said arms, the said blocks being made of sufficient length to admit of shortening to fit shafts of varying diameters, substantially as and for the purpose specified.

4. The combination, in a split pulley, of the halves thereof, having cross-arms securely fastened therein, clamp-boxes secured to said arms, clamp-blocks having bearings in said arms, and bolts passing through the cross-arms, whereby the parts of the pulley are held together and firmly clamped to the shaft, substantially as specified.

In testimony that we claim the foregoing as our own we affix our signatures in presence of two witnesses.

JOHN B. CORNWALL.
H. A. BARNARD.

Witnesses:
WM. C. BENNETT,
LUTE H. PIKE.